United States Patent Office 3,476,664
Patented Nov. 4, 1969

3,476,664
PREPARATION OF 7-CHLORO-4-THIA-
OENANTHIC ACID
Jozef A. Thoma, Vaals, and Johannes W. Gielkens and
Werner Reichrath, Geleen, Netherlands, assignors to
Stamicarbon N.V., Heerlen, Netherlands
No Drawing. Filed June 8, 1966, Ser. No. 555,987
Claims priority, application Netherlands, June 9, 1965,
6507299
Int. Cl. B01j 1/10
U.S. Cl. 204—158                                    4 Claims

ABSTRACT OF THE DISCLOSURE

It has been found that 7-chloro-4-thia-oenanthic acid may be prepared by reaction of beta-mercaptopropionic acid with allyl chloride in the presence of a solvent and under the influence of ultra-violet light. Instead of the acid, nitrile or ester or salt thereof may be used. This process produces 7-chloro-4-thia-oenanthic acid and derivatives thereof, e.g. the nitrile, useful in the preparation of the corresponding 7-amino compounds.

The present invention relates to a novel preparation of the novel compound, 7-chloro-4-thia-oenanthic acid, which substance has not yet been mentioned in literature. This new substance can be used as a starting material in the preparation of other substances, e.g., the preparation of 7-amino-4-thia-oenanthic acid, which may be used as an amino acid. 7-amino-4-thia-oenanthic acid is described in copending application, which is the application of Ottenheym, Serial No. 555,952, filed of even date herewith.

It has now been found that 7-chloro-4-thia-oenanthic acid may be prepared by reaction of beta-mercaptopropionic acid with allyl chloride in the presence of a solvent and under the influence of ultra-violet irradiation. The 7-chloro-4-thia-oenanthic acid product can be recovered from the resulting reaction product. In place of the beta-mercaptopropionic acid, the nitrile or an ester or a salt thereof may be used, in which case the resulting nitrile or ester or salt of 7-chloro-4-thia-oenanthic acid formed in the reaction mixture may be first converted to the free acid, by conventional means already known, prior to recovering the free acid desired product.

The aforesaid starting materials may be reacted without need for any special measures as regards control of pressure and temperature. The reaction may thus be effected conveniently under atmospheric pressure and at room temperature, e.g., about 10–30° C.

The practice of the reaction process of this invention requires irradiation with ultra-violet rays. Irradiation with sunlight will permit the reaction to proceed but only at a very slow rate. The reaction is, therefore, practically conducted with use of the customary artificial sources of ultra-violet radiation, e.g., mercury vapor lamps, which emit rays having a wavelength of below 3000 angstrom units, whereby the reaction may be completed in only 1–2 hours.

In the process carried out according to this invention, the chemical addition of the beta-mercaptopropionic acid to the allyl chloride takes place. As stated, however, the process may also be practiced using the corresponding ester or salt or the nitrile of beta-mercaptopropionic acid as starting material. In this reaction it is not necessary to use an excess amount of one of the starting materials, and thus the reaction is usually and most conveniently carried out with approximately equimolar amounts.

It has furthermore appeared that the process proceeds more smoothly and yields smaller amounts of undesired by-products if it is conducted in the presence of an inert gas, for example hydrogen or nitrogen. This can be achieved in any simple fashion, as by passing a flow of inert gas through the reaction mixture. The amount of inert gas may be varied, for instance, from about 1.1–5 moles of hydrogen per mole of allyl chloride is adequate.

To assist the smooth reaction of the starting materials with each other, use is made of a solvent which will dissolve the same. Suitable solvents are, for instance, hydrocarbons, such as benzene, and polar solvents, such as alcohols. The amount of solvent may be varied but as a rule, use is made of an amount by weight of solvent which is approximately equal to the amount by weight of the combined starting materials, so that the reaction mixture contains about 50% by weight of solvent. This is not a critical feature, however, and the amount of solvent may be widely varied, e.g., from 10% to 90% by weight of the combined starting material.

If the starting material is a salt of beta-mercaptopropionic acid, e.g., an alkali metal salt, the corresponding salt of 7-chloro-4-thia-oenanthic acid will be formed. Such a salt can be readily converted to 7-chloro-4-thia-oenanthic acid by simply treating it with an equivalent amount of acid.

If the nitrile of beta-mercaptopropionic acid is used as starting material, the product of the addition reaction will be 7-chloro-4-thia-oenanthic nitrile. This is also a novel substance and can be converted to 7-chloro-4-thia-oenanthic acid by means already known, for such purposes, usually by treating it with an acid.

The esters of beta-mercaptopropionic acid that can be used as starting materials may be chosen from the group of aliphatic, cyclo-aliphatic, and aromatic esters. Examples of such suitable esters are: lower alkyl esters such as methyl, ethyl, isopropyl and butyl esters, lower cycloalkyl such as cyclohexyl esters, and monocyclic carbocyclic aryl esters such as phenyl esters of beta-mercaptopropionic acid. If an ester is used as starting material, the corresponding ester of 7-chloro-4-thia-oenanthic acid is formed as the product of the addition reaction. This ester can thus be converted to 7-chloro-4-thia-oenanthic acid by conventional methods, e.g., by hydrolysis with the aid of an acid. It is preferred to remove the resulting alcohol during such hydrolysis reaction, e.g., by distillation, which technique has a favorable effect on the course of the hydrolysis.

If the process of this invention uses beta-mercaptopropionic acid as the starting material and an alcohol is used as the solvent, an ester will form. Thus, as the reaction product is further processed, the presence of an ester product therein should be taken into account so that maximum recovery of the desired acid product is achieved.

The recovery from the reaction product of the 7-chloro-4-thia-oenanthic acid, which is a liquid at room temperature, may be achieved by distillation.

The 7-chloro-4-thia-oenanthic acid can then be converted to 7-amino-4-thia-oenanthic acid by reacting it with ammonia. This reaction is usually carried out at an elevated pressure, e.g., within the range of about 30–70 atm., and at a temperature of about 50–100° C.

It will be appreciated, as stated, that the practice of this invention is very simply achieved and requires little more than bringing together the indicated reactants in a suitable solvent and indicating the same with a conventional source of ultraviolent light. Thus, the following examples are intended merely to illustrate specific modes of practice of this invention, which invention is not to be limited thereto.

EXAMPLE I

In a ½-litre reaction vessel (quartz) provided with a stirrer, 38.2 g. of allyl chloride (0.5 mole) is dissolved in 80 ml. of benzene, after which 52 g. of beta-mercaptopropionic acid is added. The reaction mixture is irradiated with ultraviolet rays at a temperature of 22° C. for 1½ hours, while a flow of hydrogen is passed through (5 litres per hour, measured at 0° C. and 1 atm.).

Subsequently, the benzene is removed by distillation and the residue is distilled in vacuo.

The yield is 74.7 g. of 7-chloro-4-thia-oenanthic acid (boiling point: 145° C. at 1.5 mm. Hg), which corresponds to an efficiency of 82%.

EXAMPLE II

The experiment described in Example I is repeated except that, after removal of the benzene by distillation, the residue is dissolved in 400 ml. of 1,2-dichloro-ethane.

After addition of 119 g. of thionyl chloride, the solution is boiled for 1½ hours with reflux cooling. The solution is then subjected to a distillation, whereby the 1,2 - dichloro - ethane solvent is recovered and, subsequently, the acid chloride of 7 - chloro - 4 - thia - oenanthic acid (boiling point: 99° C. at 0.8 mm. Hg) is obtained in vacuo.

This acid chloride is heated in 300 ml. of boiling water for 1 hour and then evaporated till dry.

The yield is 72 g. of 7 - chloro - 4 - thia - oenanthic acid (efficiency: 79%).

EXAMPLE III

In a ½-litre reaction vessel (quartz) provided with a stirrer, 38.2 g. of allyl chloride (0.5 mole) is dissolved in 80 ml. of ethanol, after which 67 g. of the ethyl ester of beta-mercaptopropionic acid is added. The reaction mixture is irradiated with ultra-violet rays at a temperature of 26° C. for two hours.

The solution is then subjected to a distillation, in which first the ethanol is recovered and then 84.5 g. of the ethyl ester of 7-chloro-4-thia-oenanthic acid (boiling point: 118° C. at 1.5 mm. Hg) is obtained (efficiency: 80%).

Of the resulting ester 52.6 g. is fed into 250 ml. of concentrated hydrochloric acid and the mixture is boiled for ½ hour with reflux cooling. The mixture is then evaporated to dryness and the residue is fed again into 250 ml. of hydrochloric acid and then boiled for ½ hour. After this mixture has been evaporated to dryness, this treatment with hydrochloric acid is repeated once more.

The yield is 41 g. of 7-chloro-4-thia-oenanthic acid (efficiency: 90% with respect to the ester).

EXAMPLE IV

In a ½-litre reaction vessel (quartz) provided with a stirrer, 38.2 g. of allyl chloride (0.5 mole) is dissolved in 100 ml. of toluene, after which 43.5 g. of beta-mercaptopropionic nitrile (0.5 mole) is added. The reaction mixture is irradiated with ultra-violet rays at a temperature of 25° C. for two hours.

The mixture is then subjected to a distillation, in which, after recovery of the toluene, 69.5 g. of the nitrile of 7-chloro-4-thia-oenanthic acid (boiling point: 115° C. at 1.5 mm. Hg) is obtained (efficiency: 85%).

Of the resulting nitrile 41 g. is fed into 250 ml. of concentrated hydrochloric acid and the mixture is boiled for 1 hour with reflux cooling, the mixture being then evaporated to dryness. To separate the resulting ammonium chloride, the product is extracted with ether and the ether is evaporated.

The yield is 41 g. of 7-chloro-4-thia-oenanthic acid (efficiency: 90%).

EXAMPLE V

The preparation of 7-amino-4-thia-oenanthic acid from the 7-chloro-4-thia-oenanthic acid provided by this invention may be effected by heating 80.7 g. (0.44 mole) of the chloro-acid together with 255 g. (15 moles) of ammonia in an autoclave during 10 hours at a temperature of 80° C. The pressure in the autoclave is 45 atm. Subsequently the reaction product is disolved in water and the solution is boiled to remove ammonia. The aminoacid is separated from the solution by passing the solution through a cation exchanger. After washing the exchanger with water the amino-acid is extracted from the exchanger with aqueous ammonia and the solution thus obtained is evaporated to dryness. The residue is 55 g. of 7-amino-4-thia-oenanthic acid with a melting point of 172° C. (yield 76%).

What is claimed is:

1. A process for the preparation of addition products of allyl chloride and a mercapto-compound selected from the class consisting of beta-mercaptopropionic acid, beta-mercaptopropionitrile, a lower hydrocarbyl ester of beta-mercaptopropionic acid, the hydrocarbyl radical of which contains less than 7 carbon atoms and is selected from lower alkyl, cyclohexyl and phenyl, and an alkali metal salt of beta-mercaptopropionic acid, comprising reacting the said mercapto-compound with allyl chloride, the reaction being carried out in a solvent medium with the aid of ultra-violet irradiation at a temperature of 10–30° C. and under atmospheric pressure, until the addition product is formed, which thus produces 7-chloro-4-thiaoenanthic acid from the beta-mercaptopropionic acid, 7-chloro-4-thia-oenanthonitrile from the beta-mercaptopropionitrile, the corresponding hydrocarbylester of 7-chloro-4-thia-oenanthic acid from the hydrocarbyl ester of beta-mercaptopropionic acid, and the corresponding alkali metal salt of 7-chloro-4-thia-oenanthic acid from the alkali metal salt of beta-mercaptopropionic acid.

2. The process of claim 1 where the said esters are selected from ethyl, isopropyl, butyl, cyclohexyl and phenyl esters.

3. The process of claim 1 wherein the nitrile of beta-mercaptopropionic acid is used.

4. The process of claim 1 wherein a lower alkyl ester of beta-mercaptopropionic acid is used.

References Cited

UNITED STATES PATENTS

| | | | |
|---|---|---|---|
| 2,392,294 | 1/1946 | Rust et al. | 204—158 |
| 2,393,327 | 1/1946 | Langkammerer | 204—158 XR |
| 2,522,590 | 9/1950 | Vaughan et al. | 204—158 |
| 2,913,479 | 11/1959 | Heininger et al. | 260—465.7 |
| 3,048,569 | 8/1962 | Harris | 204—158 XR |
| 3,140,306 | 7/1964 | Heininger | 260—465.7 XR |

OTHER REFERENCES

Wagner and Zook, "Synthetic Organic Chemistry," 1953, John Wiley & Sons, New York, pages 412, 416, 417. QD-262-W24.

JOSEPH P. BRUST, Primary Examiner

U.S. Cl. X.R.

260—465.7, 481, 534, 539